United States Patent
Umeno et al.

(10) Patent No.: US 10,226,755 B2
(45) Date of Patent: Mar. 12, 2019

(54) NOX STORAGE REDUCTION CATALYST FOR PURIFYING EXHAUST GAS AND EXHAUST GAS PURIFICATION METHOD USING SAID CATALYST

(71) Applicant: UMICORE SHOKUBAI JAPAN CO., LTD., Tokoname-shi, Aichi (JP)

(72) Inventors: Takahiro Umeno, Himeji (JP); Masaya Hanzawa, Himeji (JP); Yoshiyuki Hayashi, Himeji (JP)

(73) Assignee: UMICORE SHOKUBAI JAPAN CO., LTD., Tokoname-Shi, Aichi (JP)

( * ) Notice: Subject to any disclaimer, the term of this patent is extended or adjusted under 35 U.S.C. 154(b) by 0 days.

(21) Appl. No.: 14/766,618

(22) PCT Filed: Feb. 7, 2014

(86) PCT No.: PCT/JP2014/052951
§ 371 (c)(1),
(2) Date: Aug. 7, 2015

(87) PCT Pub. No.: WO2014/123232
PCT Pub. Date: Aug. 14, 2014

(65) Prior Publication Data
US 2015/0375205 A1    Dec. 31, 2015

(30) Foreign Application Priority Data
Feb. 8, 2013    (JP) ................. 2013-023674

(51) Int. Cl.
| F01N 3/08 | (2006.01) |
| B01D 53/94 | (2006.01) |
| B01J 23/00 | (2006.01) |
| B01J 23/10 | (2006.01) |
| B01J 23/63 | (2006.01) |
| B01J 35/00 | (2006.01) |
| B01J 35/04 | (2006.01) |
| B01J 37/00 | (2006.01) |
| B01J 37/02 | (2006.01) |
| B01J 37/08 | (2006.01) |

(52) U.S. Cl.
CPC ............ B01J 23/63 (2013.01); B01D 53/945 (2013.01); B01J 23/002 (2013.01); B01J 23/10 (2013.01); B01J 35/04 (2013.01); B01J 37/0036 (2013.01); B01J 37/0242 (2013.01); B01J 37/0248 (2013.01); B01J 37/08 (2013.01); *B01D 2255/1021* (2013.01); *B01D 2255/204* (2013.01); *B01D 2255/2065* (2013.01); *B01D 2255/40* (2013.01); *B01D 2255/91* (2013.01); *B01D 2255/9207* (2013.01); *B01J 35/002* (2013.01); *B01J 2523/00* (2013.01); *F01N 3/0871* (2013.01); *Y02T 10/22* (2013.01)

(58) Field of Classification Search
CPC ........ B01J 23/63; B01J 23/10; B01J 37/0036; B01J 35/04; B01J 37/0248; B01J 23/002; B01J 37/0242; B01J 37/08; B01J 35/002; B01J 2523/00; B01D 53/945; B01D 2255/9207; B01D 2255/2065; B01D 2255/40; B01D 2255/1021; B01D 2255/91; B01D 2255/204; Y02T 10/22; F01N 3/0871

See application file for complete search history.

(56) References Cited

U.S. PATENT DOCUMENTS

| 8,425,869 | B2 | 4/2013 | Sato et al. | |
| 2001/0022956 | A1* | 9/2001 | Okamoto | B01D 53/9422 423/213.5 |
| 2002/0031452 | A1* | 3/2002 | Okamoto | B01D 53/9422 422/168 |
| 2002/0141908 | A1* | 10/2002 | Miyoshi | B01D 53/9422 422/168 |
| 2007/0196245 | A1 | 8/2007 | Fujita et al. | |
| 2008/0187714 | A1 | 8/2008 | Wakamatsu et al. | |
| 2009/0288401 | A1 | 11/2009 | Kaneshiro et al. | |
| 2011/0113754 | A1 | 5/2011 | Kohara et al. | |
| 2011/0219748 | A1 | 9/2011 | Akama et al. | |

FOREIGN PATENT DOCUMENTS

| CN | 102131582 | A | | 7/2011 |
| EP | 0 552 172 | A1 | | 7/1993 |
| EP | 1820561 | A1 | | 8/2007 |
| EP | 1952876 | A1 | | 8/2008 |
| EP | 2363206 | A1 | | 9/2011 |
| EP | 2438984 | A1 | | 4/2012 |
| IN | 47/2011 | A | | 11/2011 |
| JP | S58-050458 | A | | 3/1983 |
| JP | 10-128118 | A | | 5/1998 |
| JP | 2001-179092 | A | | 7/2001 |
| JP | 2001179092 | A | * | 7/2001 |
| JP | 2002-204955 | A | | 7/2002 |
| JP | 2009-022929 | A | | 2/2009 |
| JP | 2009255057 | A | * | 11/2009 |

(Continued)

OTHER PUBLICATIONS

Mather et al., "Strontium Superstoichimetry and Defect Structure of SrCeO3 Perovskite," Inorg. Chem. 2008, 47, 921-929.*

(Continued)

Primary Examiner — Anthony J Zimmer
(74) Attorney, Agent, or Firm — Buchanan Ingersoll & Rooney PC

(57) ABSTRACT

The present invention is to provide a NOx storage reduction catalyst for purifying exhaust gas capable of efficiently removing carbon monoxide (CO), a hydrocarbon (HC), and a nitrogen oxide (NOx), in particular NOx, which are harmful components contained in exhaust gas. The NOx storage reduction catalyst for purifying exhaust gas of the present invention is characterized by being obtained by using a complex oxide of strontium and cerium as a catalytic active component, in which the complex oxide of strontium and cerium adsorbs 1.0 mL or less of oxygen per gram in a 400° C. atmosphere, and sinters a precursor at 300° C. or more.

8 Claims, 1 Drawing Sheet

(56) References Cited

FOREIGN PATENT DOCUMENTS

| | | | |
|---|---|---|---|
| JP | 2010-69380 A | 4/2010 | |
| JP | 2012-55842 A | 3/2012 | |
| JP | 2012-125767 A | 7/2012 | |
| JP | 5122196 B2 | 11/2012 | |
| WO | WO 9204965 A1 * | 4/1992 | ........... B01D 53/945 |

OTHER PUBLICATIONS

Notification Concerning Transmittal of International Preliminary Report on Patentability (Form PCT/IB/326), Notification of Transmittal of Translation of the International Preliminary Report on Patentability (Forms PCT/IB/338 and PCT/IB/373) and the Written Opinion of the International Searching Authority (Form PCT/ISA/237) dated Aug. 20, 2015, by the International Bureau of WIPO in corresponding International Application No. PCT/JP2014/052951. (13 pages).

International Search Report (PCT/ISA/210) dated Mar. 25, 2014, by the Japanese Patent Office as the International Searching Authority for International Application No. PCT/JP2014/052951.

Written Opinion (PCT/ISA/237) dated Mar. 25, 2014, by the Japanese Patent Office as the International Searching Authority for International Application No. PCT/JP2014/052951.

Extended European Search Report dated Aug. 12, 2016, issued by the European Patent Office in corresponding European Application No. EP 14748868.8 (10 pages).

Office Action (Notification of Reason for Refusal) dated Sep. 27, 2016, by the Japanese Patent Office in corresponding Japanese Patent Application No. 2014-560826, and an English Translation of the Office Action. (8 pages).

Office Action (The Third Office Action) dated Jun. 7, 2017 by the State Intellectual Property Office of the People's Republic of China in corresponding Chinese Patent Application No. 201480007803.8 and an English Translation of the Office Action. (15 pages).

Second Office Action dated Dec. 13, 2016, by the State Intellectual Property Office of People's Republic of China in corresponding Chinese Patent Application No. 2014800007803.8 with an English translation of the Second Office Action. (13 pages).

Office Action dated Dec. 7, 2017, by the State Intellectual Property Office of People's Republic of China in corresponding Chinese Patent Application No. 201480007803.8 and an English Translation of the Office Action. (16 pages).

Su, et al., "Technology for Controlling Emission of Nitrogen Oxides from Coal," Catalytic (direct) decomposition process, 2005, p. 163, and English Translation. (6 pages).

Communication pursuant to Article 94(3) EPC dated Mar. 8, 2018, by the European Patent Office in corresponding European Patent Application No. 14 748 868.8. (12 pages).

Examination Report dated Jun. 18, 2018, by the Indian Patent Office in corresponding Indian Patent Application No. 4837/CHENP/2015 with English translation. (6 pages).

* cited by examiner

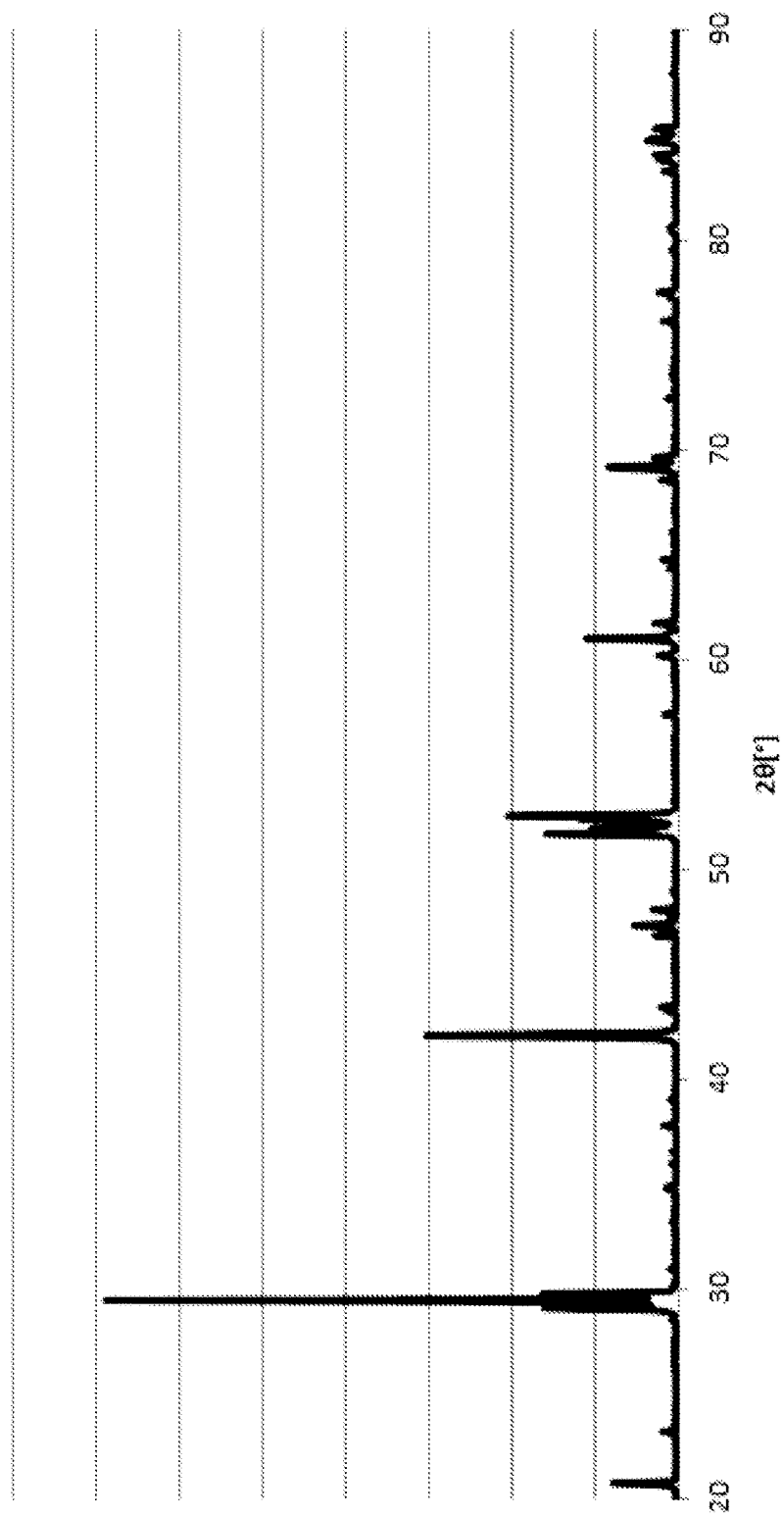

NOX STORAGE REDUCTION CATALYST FOR PURIFYING EXHAUST GAS AND EXHAUST GAS PURIFICATION METHOD USING SAID CATALYST

TECHNICAL FIELD

The present invention relates to a NOx storage reduction catalyst for purifying exhaust gas, and to an exhaust gas purification method using the catalyst. For more details, the present invention relates to a catalyst for purifying exhaust gas, which is intended to remove particularly nitrogen oxides (NOx) among the harmful components contained in exhaust gas of a gasoline engine and a diesel engine, and to an exhaust gas purification method using the catalyst.

BACKGROUND ART

The NOx in the air causes photochemical smog and acid rain. Therefore, exhaust of NOx from an automobile provided with an internal-combustion engine that is one of NOx generation sources becomes a social problem. Therefore, from now on, as to the exhaust amount of NOx, the investigation is advanced in the direction of severe laws and regulations. However, a diesel engine, and a lean burn gasoline engine are lean combustion in which oxygen is present in a large amount, therefore, NOx is hardly reduced and removed. Therefore, a NOx storage reduction catalyst for purifying exhaust gas, which is characterized in that NOx is stored in an oxidizing atmosphere, and the stored NOx is reduced and purified in a reducing atmosphere has been developed.

It is described that a cerium oxide is extremely useful for a NOx storage reduction catalyst for purifying exhaust gas, and NOx adsorption is performed by an oxygen storage-release function even in a low temperature range of 300° C. or less, and further, the cerium oxide itself also serves as a NOx adsorbent. (Patent Literature 1)

In addition, according to Patent Literature 2, it is described that the metal catalyst is heated by utilizing the reaction heat of cerium oxide having an oxygen storage-release function to enhance the catalytic activity.

CITATION LIST

Patent Literature

Patent Literature 1: Japanese Patent No. 5122196 (corresponding to U.S. Pat. No. 8,425,869)
Patent Literature 2: Japanese Patent Application Laid-Open No. 2012-55842

SUMMARY OF INVENTION

Technical Problem

However, the cerium oxide has an oxygen storage-release function while having excellent NOx adsorption performance even in a low temperature range of 300° C. or less, therefore, at the time of shifting from the oxidizing atmosphere to the reducing atmosphere, the cerium oxide serves in the direction of releasing oxygen, as a result of which, there is a drawback to suppress the NOx reduction reaction. Further, conversely, at the time of shifting from the reducing atmosphere to the oxidizing atmosphere, the cerium oxide serves in the direction of absorbing oxygen, therefore, particularly, there is a drawback to be poor in the early NOx adsorption, and storage performance.

The present invention has been made in view of such circumstances, and an object of the present invention is to provide a NOx storage reduction catalyst for purifying exhaust gas, which promptly generates the NOx reduction reaction at the time of shifting to the reducing atmosphere, and can efficiently reduce and remove NOx, in spite of containing a cerium oxide.

Solution to Problem

As a result of intensive studies to achieve the purpose described above, the present inventors have found that by using a complex oxide of strontium and cerium as a catalytic active component for a catalyst, NOx that is a harmful component contained in exhaust gas can efficiently be reduced and removed at the time of shifting to the reducing atmosphere, and thus have completed the present invention.

Further, it can be achieved that by using a catalyst for purifying exhaust gas of the present invention, exhaust gas, particularly, NOx is subjected to a reduction treatment.

Advantageous Effects of Invention

By using a catalyst of the present invention, particularly NOx among the CO, HC, and NOx, which are harmful components contained in exhaust gas, can efficiently be removed.

BRIEF DESCRIPTION OF DRAWINGS

FIG. 1 is an X-ray (Cu K$\alpha_1$, $\lambda$=1.5405 Å) diffraction pattern of the powder B (a complex oxide of strontium and cerium) produced in accordance with Example1. The horizontal axis is diffraction angle (2θ), and the vertical axis is intensity.

DESCRIPTION OF EMBODIMENTS

The first invention of the present invention is a catalyst for purifying exhaust gas characterized in that a complex oxide of strontium and cerium is used as a catalytic active component. By using the complex oxide, as compared with the case where a cerium oxide and a strontium oxide are used alone individually, or as a mixture thereof, a NOx reduction reaction is promptly generated at the time of shifting to the reducing atmosphere, and NOx can efficiently be reduced and removed, the removal efficiency of NOx is improved at the time of shifting to the reducing atmosphere, while maintaining the NOx adsorption performance particularly in the low temperature range of 300° C. or less.

The mechanism in which such a result is obtained is unknown, however, it can be considered as follows. Further, the present invention is not limited to the following reasoning. That is, as to the complex oxide of strontium and cerium, cerium is present apparently in an excess electron state (reduced state) by the electron-donating function of strontium. On the other hand, the oxygen itself has strong electron withdrawing property, therefore, electrons on cerium are strongly attracted to the oxygen side. The bonding between cerium and oxygen tends to be stronger than that between ceriums alone. Since oxygen is strongly bonded to cerium, oxygen is hardly released as the gas even if the exhaust gas is shifted from in the oxidizing atmosphere to in the reducing atmosphere, that is, to in an atmosphere to easily release the oxygen as the gas, and the exhaust gas becomes easy to maintain the reducing atmosphere. A reducing agent for HC, CO, and the like in exhaust gas can easily react with NOx in the exhaust gas because oxygen is less in the exhaust gas, therefore, it is considered that NOx is reduced to nitrogen.

When the exhaust gas is shifted from in a reducing atmosphere to in an oxidizing atmosphere, oxygen in exhaust gas is hardly absorbed/adsorbed to the complex oxide because the cerium and the oxygen are strongly bonded to each other, however, the NOx in the exhaust gas has no relation to the bonding, and is absorbed/adsorbed to the complex oxide.

In a catalyst for treating exhaust gas that is used in a state where exhaust gas is alternately repeated in an oxidizing atmosphere and in a reducing atmosphere, a cerium oxide having an oxygen storage function is essential. However, in a situation where the exhaust gas temperature varies, particularly the exhaust gas temperature is in a low temperature range of 300° C. or less, it is considered that there is a drawback of the cerium oxide.

It has been found that the drawback can be mitigated by the formation of a complex with strontium, and a NOx storage reduction catalyst for purifying exhaust gas according to the present invention has been completed. Hereinafter, the present invention will be described in detail.

The complex oxide of strontium and cerium according to the present invention is characterized by being used as a catalytic active component. The size of the average particle diameter is not particularly limited.

(Complex Oxide of Strontium and Cerium)

The ratio of strontium oxide (SrO) and cerium oxide ($CeO_2$) in a complex oxide of strontium and cerium may be any ratio as long as a complex oxide can be formed, however, has a $SrO/CeO_2$ of preferably 0.2 to 2.0 (mole ratio), more preferably 0.33 to 1.2, and most preferably 0.9 to 1.1. With such a ratio, the above-described effect of a complex oxide is effectively exerted, and further, a complex oxide can easily be formed.

The complex oxide of strontium and cerium is preferably a perovskite-type complex oxide represented by $SrCeO_3$. Herein, a complex oxide of strontium and cerium, preferably a perovskite-type complex oxide represented by $SrCeO_3$ can be confirmed by an X-ray (Cu K$\alpha_1$, $\lambda$=1.5405 Å) diffraction. Specifically, in an X-ray (Cu K$\alpha_1$, $\lambda$=1.5405 Å) diffraction pattern, when four peaks in total of three peaks in the vicinity of 29° and one peak in the vicinity of 42° of diffraction angle (2θ) are present, the sample can be confirmed to be a complex oxide of strontium and cerium, preferably a perovskite-type complex oxide represented by $SrCeO_3$.

In the complex oxide, the oxygen adsorption amount (mL) per gram of a sample (catalyst) at a catalyst inlet gas temperature of 400° C. (atmospheric temperature) by pulse analysis is preferably 1.0 mL or less. That is, a complex oxide of strontium and cerium preferably adsorbs 1.0 mL or less of oxygen per gram in a 400° C. atmosphere. The oxygen adsorption amount (mL) per gram of a sample (catalyst) at a catalyst inlet gas temperature of 400° C. (atmospheric temperature) by pulse analysis is more preferably 0.5 mL or less, and furthermore preferably 0.2 mL or less. The lower limit value is not particularly limited, however, is 0 mL or more, and preferably more than 0 mL. When the oxygen adsorption amount exceeds 1.0 mL, oxygen storage capacity (OSC) works, and there may be a case where a NOx reduction reaction is suppressed in a reducing atmosphere.

The pulse analysis is performed as follows. A sample weighed in advance is arranged in a reaction tube capable of adjusting a temperature, and the sample is subjected to a reduction treatment with hydrogen gas, then an inert gas is thoroughly passed through the sample, and then a mixed gas containing oxygen is introduced in a predetermined amount (oxygen pulse). The introduction operation is continued until the oxygen amount introduced into a sample becomes the same as that at a downstream of the sample. At the beginning, the oxygen amount at a downstream of a sample is less than the oxygen amount introduced into the sample, and the difference amount is the oxygen amount adsorbed in the sample. The total of oxygen amount adsorbed in each pulse is the oxygen adsorption amount of 1 g of the sample (catalyst).

A production method of a complex oxide of strontium and cerium according to the present invention is not particularly limited. For example, a method in which a strontium source (for example, a water-soluble strontium salt) and a cerium source (for example, a water-soluble cerium salt) are dissolved in water, and mixed, then the resultant mixture is pH adjusted to be coprecipitated as a hydroxide, and then the coprecipitated hydroxide is dried and sintered (coprecipitation method); a method in which one of a strontium source (for example, a salt of strontium) and a cerium source (for example, a salt of cerium) is used as a solid source, and the other is used as an aqueous solution, the one is impregnated with the aqueous solution, and then the impregnated resultant is dried and sintered (impregnation method); and a method in which each solid source is mixed, and the resultant mixture is dried and sintered (mixed method) can be used, however, a mixed method is preferred. As the mixed method, a method is preferred, in which a strontium source (for example, a salt of strontium) and a cerium source (for example, a salt of cerium) are mixed and ground by a dry process or a wet process (for example, using water), and then the resultant is dried and sintered.

In the above method, the mixture ratio of a strontium source and a cerium source is not particularly limited, however, is preferably a mixture ratio so as to be a ratio (mole ratio) of strontium oxide (SrO) and cerium oxide ($CeO_2$) described above. Further, the addition amount of water in a case of adding water (wet mixing) is also not particularly limited, however, in consideration of the easiness of wet grinding, the easiness of drying, and the like, it is preferred to add around 100 to 200 parts by weight of water based on 100 parts by weight in total of the strontium source and the cerium source.

The sintering may be performed in one stage, or may be performed in multiple stages. In a case where the sintering is performed in one stage, the sintering temperature is not particularly limited, however, is preferably 600° C. or more, more preferably 700 to 1200° C., and furthermore preferably 800 to 1150° C. Further, the sintering time is not particularly limited, however, is preferably 0.5 to 20 hours, and more preferably 1.0 to 15 hours. With such conditions, a complex oxide of strontium and cerium can efficiently be produced.

The sintering method and conditions in a case where the sintering is performed in multiple stages, are not particularly limited, however, for example, in a case where the sintering is performed in two stages, it is preferred that the sintering is temporarily performed at a temperature of 300° C. or more to less than 600° C. for 0.25 to 10 hours, and a mixture containing strontium and cerium (for example, a mixture of an oxide of strontium and an oxide of cerium) is obtained, and then the mixture is sintered at a temperature of 600° C. or more for 0.5 hour or more. That is, it is preferred that the complex oxide of strontium and cerium is obtained by the sintering of a precursor (a mixture of a strontium source and a cerium source) at 600° C. or more.

In addition, in a case where the mixing is performed by using water (wet mixing), it is preferred that the mixture is dried in advance, and water content is removed before the sintering. Further, the drying conditions in this case are not particularly limited as long as a sufficient amount of water is removed, and may appropriately be selected depending on the mixed amount of water.

As a cerium source, powders or the like of a hydroxide, a nitrate, an acetate, a carbonate, and an oxide can be used, and an oxide is preferred.

As a strontium source, a hydroxide, a carbonate, a nitrate, an acetate, or the like, can be used, and a carbonate is preferred.

(NOx Storage Reduction Catalyst for Purifying Exhaust Gas)

A NOx storage reduction catalyst for purifying exhaust gas is formed basically by the covering of a support used for a catalyst with a complex oxide of strontium and cerium as a catalytic active component. Preferably, a fire-resistant inorganic oxide and/or a co-catalyst component can be contained. Further, for the purpose of NOx reduction, or oxidation of HC, CO and particulate, a noble metal can also be added. That is, it is preferred that a NOx storage reduction catalyst for purifying exhaust gas of the present invention further contains a noble metal.

Herein, as the support, a support used usually as a support for purifying exhaust gas in the field can be used without any limitation, however, it is preferred to use a three-dimensional structure. As the three-dimensional structure, for example, a heat-resistant support such as a honeycomb support can be used. Further, as the three-dimensional structure, an integrally molded body (monolithically-fabricated structured body) is preferred, for example, a monolithic support, a metal honeycomb support, a plugged honeycomb support such as a diesel particulate filter, a punching metal, or the like can preferably be used. Further, it is not necessarily required to use a monolithic three-dimensional structure, and for example, a pellet support or the like can also be used.

As a monolithic support, a support that is usually referred to as a ceramic honeycomb support may be used, and particularly, a honeycomb support using cordierite, mullite, α-alumina, silicon carbide, silicon nitride, or the like as a raw material is preferable. Among them, a cordierite-based honeycomb support (a cordierite support) is particularly preferable. In addition, a monolithic structure or the like, which is obtained by using an oxidation-resistant and heat-resistant metal containing stainless steel, a Fe—Cr—Al alloy, and the like, can be used.

The monolithic support is produced by an extrusion molding method, a method of winding and hardening a sheet-shaped element, or the like. The shape of the through port (gas passing port, cell shape) may be any one of hexagonal (honeycomb), quadrilateral, triangular, or corrugated (corrugation). The monolithic support can sufficiently be used as long as the cell density (the number of cells/unit cross-sectional area) thereof is 100 to 1200 cells/square inch. The cell density is preferably 200 to 900 cells/square inch, and more preferably 250 to 600 cells/square inch. Further, a method for supporting a catalyst of the present invention on a three-dimensional structure is not particularly limited. For example, a method of wash coating, or the like can be used.

The use amount of a complex oxide of strontium and cerium is not particularly limited, however, is preferably 10 to 450 g, more preferably 10 to 200 g, and furthermore preferably 20 to 100 g per liter (L) of catalyst. When a use amount exceeding the above-mentioned amount is contained in a catalyst, the mechanical strength of the catalyst is decreased, therefore, this is not preferred.

The fire-resistant inorganic oxide in a case where a catalyst of the present invention further contains a fire-resistant inorganic oxide is not particularly limited as long as being usually used as a catalyst support. Specific examples of the fire-resistant inorganic oxide include an aluminum oxide ($Al_2O_3$) such as activated alumina including α-alumina, γ-alumina, δ-alumina, η-alumina, and θ-alumina; silicon oxide (silica, $SiO_2$); titanium oxide (titania, $TiO_2$); zirconium oxide (zirconia, $ZrO_2$); phosphorus oxide ($P_2O_5$); zeolite phosphate; or a complex oxide thereof, for example, an alumina-titania complex oxide, an alumina-zirconia complex oxide, a titania-zirconia complex oxide, a ceria-zirconia complex oxide, zeolite, and silica-alumina. Among them, aluminum oxide, silicon oxide (silica), phosphorus oxide, titanium oxide, zirconium oxide, and a ceria-zirconia complex oxide are preferred; silicon oxide (silica), zirconium oxide, aluminum oxide, and a ceria-zirconia complex oxide are more preferred; and zirconium oxide, aluminum oxide, a ceria-zirconia complex oxide, and powder of activated alumina are furthermore preferred. Particularly preferably, a single oxide such as γ-alumina, silica, titania, and zirconia, and a complex oxide thereof are used. The above-described fire-resistant inorganic oxide may be used alone, or may be used in a form of a mixture of two or more kinds. Further, these may be used in a form of the above-described oxide, however, the one capable of forming an oxide by heating may be used. In the latter case, a hydroxide, a nitrate, a halide such as a chloride, an acetate, a sulfate, a carbonate, or the like, of the above-described aluminum, silicon, titanium, zirconium, or phosphorus can be used.

The size of these fire-resistant inorganic oxides, which are powders, is not particularly limited, however, is usually 2 to 60 μm, preferably 5 to 50 μm, and more preferably 5 to 40 μm in average particle diameter (diameter). Further, a BET specific surface area of a fire-resistant inorganic oxide is preferably 50 to 750 $m^2/g$, and more preferably 150 to 750 $m^2/g$, from the viewpoint of supporting a catalytic active component.

The use amount (supported amount) of a fire-resistant inorganic oxide in a case where a catalyst of the present invention further contains a fire-resistant inorganic oxide is not particularly limited, however, is preferably 10 to 450 g, more preferably 30 to 400 g, furthermore preferably 40 to 200 g, and particularly preferably 50 to 100 g per liter (L) of catalyst. When the use amount is less than 10 g, a catalyst component (for example, a complex oxide of strontium and cerium, or a noble metal described in detail below) is not sufficiently dispersed, and there may be a case where the durability is not sufficient. Conversely, when the use amount exceeds 400 g, any effect matching the addition of the fire-resistant inorganic oxide is not recognized, further, effects of other catalytic active components (for example, a complex oxide of strontium and cerium, or a noble metal described in detail below) are not sufficiently exerted, and there may be a case where the activity is decreased, the pressure loss is increased, and the mechanical strength of a catalyst layer is decreased.

The co-catalyst in a case where a catalyst of the present invention further contains a co-catalyst component preferably contains at least one kind of element selected from the group consisting of an alkali metal, an alkali earth metal, and a rare earth element. Further, the complex oxide of strontium and cerium is not included in the co-catalyst component. That is, it is preferred that the catalyst of the present invention further contains at least one kind of element (co-catalyst component) selected from the group consisting of an alkali metal, an alkali earth metal, and a rare earth element (except for a complex oxide of strontium and cerium). More preferably, the catalyst of the present invention contains an oxide of at least one kind of element selected from the group consisting of an alkali metal, an alkali earth metal, and a rare earth element, and furthermore preferably contains an oxide of an alkali metal, and an alkali earth metal. As the alkali metal oxide, there is an oxide of sodium, potassium, rubidium, or cesium; as the alkali earth metal oxide, there is an oxide of strontium, or barium; and as the rare earth element oxide, there is an oxide of a rare earth element oxide selected from the group consisting of cerium, lanthanum, praseodymium, neodymium, samarium, europium, gadolinium, terbium, dysprosium, holmium, erbium, and the like. Furthermore preferably, an oxide of an alkali metal, an alkali earth metal, and a rare earth element is preferred. More preferably, there are sodium oxide, potassium oxide, barium oxide, strontium oxide, cerium oxide, and lanthanum oxide, and particularly preferably, there are potassium oxide, barium oxide, strontium oxide, and cerium oxide. In addition, these may be used alone, or may be used in a form of a mixture of two or more kinds.

The use amount (supported amount) of a co-catalyst component is not particularly limited, however, is 5 to 450 g, more preferably 5 to 200 g, furthermore preferably 5 to 70 g, and most preferably 10 to 50 g per liter (L) of catalyst. Further, when the same element as that of the complex oxide is used, the amount is a separated amount. In addition, in a case where multiple co-catalyst components are used, the use amount (supported amount) of the co-catalyst component means a total amount of the use amount (supported amount) of each co-catalyst component.

The noble metal in a case where a catalyst of the present invention further contains a noble metal is not particularly limited, however, for example, platinum, palladium, rhodium, iridium, ruthenium, and the like are included, and platinum, palladium, rhodium, and iridium are preferably used, and platinum, palladium, and rhodium are more preferably used. The above-described noble metal may be used alone, or may be used in a form of a mixture of two or more kinds.

The use amount (supported amount) of the noble metal is not particularly limited, and can appropriately be selected depending on the concentration of the harmful components to be purified (removed). Specifically, a noble metal can be used in an amount of preferably 0.1 to 15 g, and more preferably 0.5 to 10 g per liter (L) of catalyst. With such a range, the harmful components can sufficiently be removed (purified). Further, in a case where multiple noble metals are used, the use amount (supported amount) of the noble metal means a total amount of the use amount (supported amount) of each noble metal.

As to the noble metal, a noble metal black can also be used, however, another oxide covered with a noble metal can be used in order to increase the metal surface area. Particularly, it is preferred to cover a fire-resistant inorganic oxide having a large specific surface area.

(Catalyst Preparation Method)

Any method can be used as long as the complex oxide of strontium and cerium is contained, and the following methods can be used: (1) a method in which the complex oxide of strontium and cerium, and as needed, a co-catalyst component, a noble metal, and a fire-resistant inorganic oxide (for example, a fire-resistant inorganic oxide supporting a noble metal) are put into an aqueous medium, then the mixture is made into a slurry by using a wet mill such as a ball mill, a honeycomb is immersed in the slurry, the excess slurry is removed, and the resultant honeycomb is dried and sintered to obtain a catalyst; (2) a method in which the complex oxide of strontium and cerium, and a fire-resistant inorganic oxide are put into an aqueous medium, then the mixture is made into a slurry by using a wet mill such as a ball mill, a honeycomb is immersed in the slurry, the excess slurry is removed, and the resultant honeycomb is dried and sintered, subsequently the resultant honeycomb is immersed in an aqueous solution containing a water soluble noble metal salt and a water soluble salt of a co-catalyst component, then the excess solution is removed, and the resultant honeycomb is dried and sintered to obtain a catalyst; (3) a method in which the complex oxide of strontium and cerium, a co-catalyst component, and a fire-resistant inorganic oxide are put into an aqueous medium, then the mixture is made into a slurry by using a wet mill such as a ball mill, a honeycomb is immersed in the slurry, the excess slurry is removed, and the resultant honeycomb is dried and sintered, subsequently the resultant honeycomb is immersed in an aqueous solution containing a noble metal salt, the excess solution is removed, and the resultant honeycomb is dried and sintered to obtain a catalyst; (4) a method in which the complex oxide of strontium and cerium, and a fire-resistant inorganic oxide are put into an aqueous medium, then the mixture is made into a slurry by using a wet mill such as a ball mill, a honeycomb is immersed in the slurry, the excess slurry is removed, and the resultant honeycomb is dried and sintered, subsequently the resultant honeycomb is immersed in an aqueous solution containing a noble metal salt, and a salt of a co-catalyst component, the excess solution is removed, and the resultant honeycomb is dried and sintered to obtain a catalyst; (5) a method in which the complex oxide of strontium and cerium is put into an aqueous medium, then the mixture is made into a slurry by using a wet mill such as a ball mill, a honeycomb is immersed in the slurry, the excess slurry is removed, and the resultant honeycomb is dried and sintered, subsequently the resultant honeycomb is immersed in a slurry containing a co-catalyst component and a fire-resistant inorganic oxide supporting a noble metal, the excess slurry is removed, and the resultant honeycomb is dried and sintered to obtain a catalyst (layered structure); (6) a method in which the complex oxide of strontium and cerium, and a co-catalyst component are put into an aqueous medium, then the mixture is made into a slurry by using a wet mill such as a ball mill, a honeycomb is immersed in the slurry, the excess slurry is removed, and the resultant honeycomb is dried and sintered, subsequently the resultant honeycomb is immersed in a slurry containing a fire-resistant inorganic oxide supporting a noble metal, the excess slurry is removed, and the resultant honeycomb is dried and sintered to obtain a catalyst (layered structure); (7) a method in which a co-catalyst component, and a fire-resistant inorganic oxide supporting a noble metal are put into an aqueous medium, then the mixture is made into a slurry by using a wet mill such as a ball mill, a honeycomb is immersed in the slurry, the excess slurry is removed, and the resultant honeycomb is dried and sintered, subsequently the resultant honeycomb is immersed in a slurry containing the complex oxide of strontium and cerium, the excess slurry is removed, and the resultant honeycomb is dried and sintered to obtain a catalyst (layered structure); (8) a method in which a fire-resistant inorganic oxide supporting a noble metal is put into an aqueous medium, then the mixture is made into a slurry by using a wet mill such as a ball mill, a honeycomb is immersed in the slurry, the excess slurry is removed, and the resultant honeycomb is dried and sintered, subsequently the resultant honeycomb is immersed in a slurry containing a co-catalyst component, and a complex oxide of strontium and cerium, the excess slurry is removed, and the resultant honeycomb is dried and sintered to obtain a catalyst (layered structure); and the like.

(Exhaust Gas Treatment Method)

In the above method, the space velocity (S.V.) of exhaust gas is 10,000 to 300,000 $h^{-1}$, and preferably 10,000 to 100,000 $h^{-1}$.

The temperature in the exhaust gas treatment may be a temperature from in the vicinity of 200° C. to 900° C. or more, and is preferably a temperature from 200° C. to 700° C.

The exhaust gas to be subjected is an exhaust gas of an internal-combustion engine such as a diesel engine, and a gasoline engine. In particular, when the exhaust gas repeats the oxidizing atmosphere and the reducing atmosphere, an excellent effect is exerted.

When a catalyst for purifying exhaust gas of the present invention is arranged in a passage of exhaust gas, the exhaust gas can be treated, and the catalyst for purifying exhaust gas can be arranged from in the vicinity of manifold downstream of an engine to under the floor of an vehicle. Further, a catalyst having other functions can also be used in combination. For example, a catalyst and adsorbent having a hydrocarbon adsorbing function, a diesel particulate filter, a three way catalyst, or an oxidation catalyst is used. As the preferred condition for combination use, there is a condition in which a catalyst for purification of the present invention is arranged in the upstream side of exhaust gas, and a hydrocarbon adsorbent, and a diesel particulate filter are arranged in the downstream side; a condition in which a three way catalyst, or an oxidation catalyst is arranged in the upstream side of exhaust gas, and a catalyst for purifying exhaust gas of the present invention is arranged in the upstream side of exhaust gas; or the like.

EXAMPLES

The effects of the present invention will be described using the following Examples and Comparative Examples. However, the technical scope of the present invention is not limited only to the following Examples.

Example 1

161.5 g of cerium oxide, 138.51 g of strontium carbonate, and 360 g of water were mixed, then the resultant mixture was wet-milled for 14 hours by a ball mill, and an aqueous slurry A was obtained. Next, the obtained aqueous slurry A was dried at 120° C. for 12 hours, and the moisture was completely removed. The resultant was sintered at 500° C. for one hour, and powder A (a mixture of an oxide of strontium and an oxide of cerium) was obtained. Herein, the ratio (mole ratio) of strontium oxide (SrO) and cerium oxide ($CeO_2$) ($SrO/CeO_2$) in the obtained powder A was around 1.

Further, the powder A was sintered at 1100° C. for 10 hours, and powder B (a complex oxide of strontium and cerium) was obtained. Herein, the ratio (mole ratio) of strontium oxide (SrO) and cerium oxide ($CeO_2$) ($SrO/CeO_2$) in the obtained powder B (a complex oxide of strontium and cerium) was around 1.

Separately, 500 g of heat-resistant activated alumina (the average particle diameter of 30 μm), and 333.33 g of rhodium nitrate solution were supported by an impregnation method. Next, the resultant was dried at 120° C. for 12 hours, and the moisture was completely removed. Then, the resultant was sintered at 500° C. for one hour, and powder C (rhodium-alumina powder) was obtained.

Separately, 400 g of heat-resistant activated alumina (the average particle diameter of 30 μm), and 222.22 g of bis-ethanolamine platinum solution were supported by an impregnation method. Next, the resultant was dried at 120° C. for 12 hours, and the moisture was completely removed. Then, the resultant was sintered at 500° C. for one hour, and powder D (platinum-alumina powder) was obtained.

48 g of powder B, 5.19 g of powder C, and 21 g of powder D, which had been obtained in the above, 40 g of heat-resistant activated alumina (the average particle diameter of 30 μm), and 142 g of water were mixed, and an aqueous slurry B was obtained. Into the Slurry B, a commercially available cordierite monolithic honeycomb support (400 cells/square inch, 24 mm in diameter, 67 mm in length, and 0.030 L in volume) was immersed, and the excessive slurry was blown off by compressed air. Next, the resultant was dried at 150° C. for 10 minutes until the moisture was no longer left. Further, the resultant was sintered at 500° C. for one hour in an electric furnace, and a complete catalyst (A) was obtained. In this catalyst, 1 g/L of platinum, 0.15 g/L of rhodium, 48 g/L of complex oxide of strontium and cerium, and 65 g/L of alumina were supported on the support.

The oxygen adsorption amount of the powder B thus obtained was 0.01 mL/g (an oxygen adsorption amount (mL) per gram of catalyst).

Comparative Example 1

Except that powder A was not sintered at 1100° C. (that is, powder A was used in place of powder B) in Example 1, a complete catalyst (X) was obtained in the same manner as in the Example 1. In this catalyst, 1 g/L of platinum, 0.15 g/L of rhodium, 48 g/L of powder A, and 65 g/L of alumina were supported on the honeycomb support.

The oxygen adsorption amount of the powder A thus obtained was 1.48 mL/g.

Comparative Example 2

5.19 g of powder C, 21 g of powder D, 30 g of cerium oxide, 25.62 g of strontium carbonate, 29.59 g of heat-resistant activated alumina (the average particle diameter of 30 μm), and 142 g of water were mixed, and an aqueous slurry C was obtained. Into the Slurry C, a commercially available cordierite monolithic honeycomb support (400 cells/square inch, 24 mm in diameter, 66 mm in length, and 0.030 L in volume) was immersed, and the excessive slurry was blown off by compressed air. Next, the resultant was dried at 150° C. for 10 minutes until the moisture was no longer left. Further, the resultant was sintered at 500° C. for one hour in an electric furnace, and a complete catalyst (Y) was obtained. In this catalyst, 1 g/L of platinum, 0.15 g/L of rhodium, 25.62 g/L of strontium oxide, 30 g/L of cerium oxide, and 62 g/L of alumina were supported on the support.

The oxygen adsorption amount of the strontium oxide and cerium oxide thus obtained was 1.39 mL/g.

(Evaluation Results of NOx Reduction)

The complete catalyst (A) prepared in the above Example 1, and the complete catalysts (X), and (Y) prepared in Comparative Examples 1, and 2 were evaluated. In the evaluation, each catalyst was arranged in a reaction tube made of stainless steel, and into the reaction tube, the flowing of gas under the condition 1 (oxidizing atmosphere) shown in Table 1 for 55 seconds, and then the flowing of gas under the condition 2 (reducing atmosphere) shown in Table 1 for 5 seconds were repeatedly performed. Each of the average NOx purification rates in the reducing atmosphere and in the oxidizing atmosphere was measured. As to the gas temperature, evaluation was performed in cases of catalyst inlet temperatures of 200° C., 300° C., 400° C., and 500° C. The NOx purification rate was calculated by the following equation. The results are shown in Table 2.

NOx purification rate (%)=100×{catalyst inlet NOx (ppm)−catalyst outlet NOx(ppm)}/catalyst inlet NOx(ppm)           [Mathematical Expression 1]

TABLE 1

|  | Condition 1 (oxidizing atmosphere) | Condition 2 (reducing atmosphere) |
|---|---|---|
| $C_3H_6$*1 | 500 ppmC | 4000 ppmC |
| CO | 1000 ppm | 1.5% |
| NO | 200 ppm | 200 ppm |
| $O_2$ | 10% | 1% |
| $CO_2$ | 6% | 6% |
| $H_2O$ | 6% | 6% |
| Time | 55 seconds | 5 seconds |

*1Propylene concentration after conversion into the number of carbon atoms
S.V.: 40,000 $hr^{-1}$

TABLE 2

| | Average NOx purification rate (%) at each catalyst bed inlet temperature for 5 seconds in reducing atmosphere | | | |
|---|---|---|---|---|
| Catalyst | 200° C. | 300° C. | 400° C. | 500° C. |
| A | 69.39 | 83.70 | 78.15 | 65.00 |
| X | 54.57 | 59.79 | 52.05 | 45.29 |
| Y | 41.36 | 67.63 | 55.55 | 51.24 |

It was shown that NOx reduction performance in a reducing atmosphere of a complete catalyst (A) containing a complex oxide of strontium and cerium used in Example 1 is 30 to 40 percent higher than that of each catalyst in Comparative Examples 1 and 2 at an exhaust gas temperature from a low temperature to a high temperature.

FIG. 1 is an X-ray (Cu $K\alpha_1$, $\lambda=1.5405$ Å) diffraction pattern of the powder B (a complex oxide of strontium and cerium) produced in accordance with Example 1. It was confirmed to be a perovskite-type complex oxide.

INDUSTRIAL APPLICABILITY

The present invention can be utilized for an exhaust gas treatment, and particularly the exhaust gas can reduce NOx under an oxygen excessive atmosphere, therefore, the present invention can be used for an automobile exhaust gas treatment.

In addition, the present application is based on the Japanese Patent Application No. 2013-023674 filed on Feb. 8, 2013, and the disclosed content thereof is referred to, and incorporated as a whole.

The invention claimed is:

1. A NOx storage reduction catalyst for purifying exhaust gas, comprising a complex oxide of strontium and cerium, a noble metal, and a fire-resistant inorganic oxide,
   wherein the complex oxide of strontium and cerium is a perovskitic complex oxide,
   wherein a mole ratio of strontium oxide and cerium oxide ($SrO/CeO_2$) in the complex oxide of strontium and cerium is 0.2 to 2.0,
   wherein an oxygen adsorption amount per gram of the complex oxide of strontium and cerium by pulse analysis is 1.0 mL or less at 400° C., the pulse analysis being performed as follows: 1 g of a sample weighed in advance is subjected to a reduction treatment with hydrogen gas, then an inert gas is thoroughly passed through the sample, and then oxygen pulse is introduced in a predetermined amount, wherein an introduction operation is continued until an oxygen amount introduced into the sample becomes the same as that at a downstream of the sample, and a total amount of oxygen adsorbed in each pulse is the oxygen adsorption amount of 1 g of the sample,
   wherein an amount of the complex oxide of strontium and cerium is 10 to 450 g per liter of the catalyst, an amount of the noble metal is 0.5 to 15 g per liter of the catalyst, and an amount of the fire-resistant inorganic oxide is 10 to 450 g per liter of the catalyst,
   wherein the noble metal comprises at least one selected from the group consisting of platinum, palladium, rhodium, iridium, and ruthenium,
   wherein the noble metal is supported on at least part of the fire-resistant inorganic oxide,
   wherein the fire-resistant inorganic oxide is at least one selected from the group consisting of an aluminum oxide, silicon oxide, titanium oxide, zirconium oxide, phosphorus oxide, zeolite phosphate, and a complex oxide thereof, and
   wherein the noble metal is not supported on the complex oxide of strontium and cerium.

2. The NOx storage reduction catalyst for purifying exhaust gas according to claim 1, wherein the complex oxide of strontium and cerium is obtained by sintering a precursor at 600° C. or more.

3. The NOx storage reduction catalyst for purifying exhaust gas according to claim 1, wherein the mole ratio of strontium oxide and cerium oxide ($SrO/CeO_2$) in the complex oxide of strontium and cerium is 0.9 to 2.0.

4. The NOx storage reduction catalyst for purifying exhaust gas according to claim 1, wherein the mole ratio of strontium oxide and cerium oxide ($SrO/CeO_2$) in the complex oxide of strontium and cerium is 0.9 to 1.2.

5. The NOx storage reduction catalyst for purifying exhaust gas according to claim 1, wherein the mole ratio of strontium oxide and cerium oxide ($SrO/CeO_2$) in the complex oxide of strontium and cerium is 0.9 to 1.1.

6. A method for purifying exhaust gas, wherein exhaust gas is treated by utilizing the catalyst for purifying exhaust gas according to claim 1, wherein the exhaust gas comprises a NOx.

7. The method for purifying exhaust gas according to claim 6, wherein a temperature in the exhaust gas treatment is 200° C. to 900° C.

8. The method for purifying exhaust gas according to claim 6, wherein a temperature in the exhaust gas treatment is 300° C. or less.

* * * * *